United States Patent
Arai et al.

[15] 3,690,735
[45] Sept. 12, 1972

[54] ANTI-SKID DEVICE FOR VEHICLES

[72] Inventors: Hiroshi Arai; Akira Nakamura, both of Toyota; Atutosi Okamoto, Toyohashi; Shunji Okumura; Motoyoshi Suzuki, both of Kariya; Akio Sugiura, Nagoya, all of Japan

[73] Assignees: Toyota Jidosha Kogyo Kabushiki Kaisha, Toyota-shi; Nippondenso Kabushiki Kaisha, Aichi-ken, Japan; part interest to each

[22] Filed: Dec. 3, 1970

[21] Appl. No.: 94,740

[52] U.S. Cl..............303/21 P, 188/181 C, 303/20, 303/21 EB
[51] Int. Cl..............................................B60t 8/08
[58] Field of Search.......188/181; 303/20, 21; 317/5; 324/160–161; 340/52 R, 263

[56] References Cited

UNITED STATES PATENTS

| | | |
|---|---|---|
| 3,245,213 | 4/1966 | Thompson et al.....303/21 EB |
| 3,494,671 | 2/1970 | Slavin et al...............303/21 P |
| 3,556,610 | 1/1971 | Leiber......................303/21 P |
| 3,604,760 | 9/1971 | Atkins.............303/21 BE UX |
| 3,615,120 | 10/1971 | Yamazaki et al......303/21 BE |
| 3,640,589 | 2/1972 | Taniguchi..............303/21 BE |

*Primary Examiner*—Milton Buchler
*Assistant Examiner*—Stephen G. Kunin
*Attorney*—Cushman, Darby & Cushman

[57] ABSTRACT

An anti-skid device for vehicles comprising a wheel speed detector for producing an output signal upon detecting that the wheel speed is below a predetermined value, a first timer circuit for producing an output signal when the output signal from the wheel speed detector remains on for more than a definite time, and a second timer circuit for energizing the braking force modulator only for a definite time upon receipt of the output signal from the first timer circuit, whereby the locking of wheels due to a braking operation by the driver may be prevented.

5 Claims, 12 Drawing Figures

Patented Sept. 12, 1972

ANTI-SKID DEVICE FOR VEHICLES

The present invention relates to an anti-skid device for vehicles designed to prevent uncontrollability of the steering wheel, spinning of the car body or the like caused by the locking of wheels which may occur when a torque derived from the frictional force produced between the brake shoes and brake drums by the braking pressure that presses the brake shoes against the brake drums as a running vehicle is quickly braked (i.e., a torque which is hereinafter simply referred to as the braking torque BT), becomes excessively larger than a torque produced relative to the center of the wheels by the reaction force acting on a road surface with which the wheels are in contact (i.e., a torque which is hereinafter simply referred to as the tire torque TT).

Figure 1:
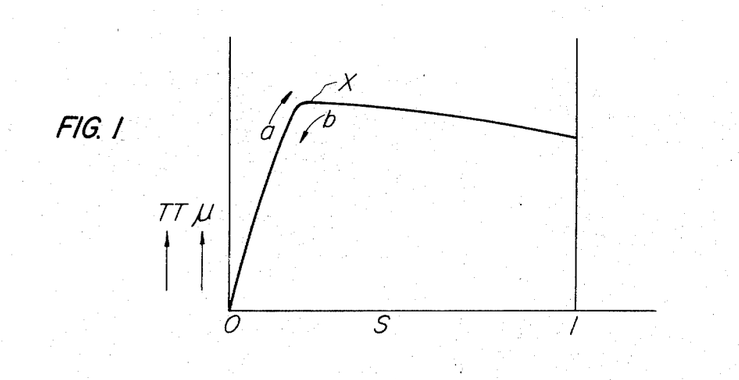
FIG. 1 is a conventional $\mu$-S characteristic diagram showing the relationship between the coefficient $\mu$ of road surface-wheel friction and the slip factor S.

In the past, it has been recognized that generally the relationship as shown in FIG. 1 exists between the friction coefficient $\mu$ between the wheels and a road surface and the slip factor S of the wheels, i.e., $$S = \frac{\text{Vehicle body speed SB} - \text{Wheel speed SW}}{\text{Vehicle body speed SB}}$$

However, the absolute value of this friction coefficient $\mu$ or the tire torque TT varies considerably under different road surface conditions, such as in the case of a dry asphalt road surface where the absolute value is large and a frozen road surface where the absolute value is small. This makes it very difficult technically to directly detect the friction coefficient $\mu$ between the wheels and a road surface or the wheel slip factor S from a vehicle running with the brakes applied thereto. Thus, the efforts have hitherto been exerted to find such factors that may be effectively substituted for the friction coefficient $\mu$ or the slip factor S so as to ideally control the braking force to always avoid the locking of wheels on all kinds of road surfaces ranging from one where the friction coefficient $\mu$ is small to another where the friction coefficient $\mu$ is large.

The purpose of the prior art devices of this kind devolved around how to slow down the speed of a vehicle without causing the locking of its wheels when braking the vehicle. Actually, most of these anti-skid devices have been so designed that the peripheral wheel deceleration is mechanically or electrically detected so that when this peripheral wheel deceleration exceeds a predetermined set value the braking force applied to the wheels is forcibly reduced irrespective of whether the driver intentionally reduces the braking force, to thereby prevent the locking of the wheels and hence uncontrollability of the steering wheel, spinning of the vehicle body or the like which may be induced by locked wheels.

In the past, these anti-skid devices have been mounted only at the driven wheels driven from the engine installed in a vehicle and no anti-skid device has been mounted at the non-driven wheels not driven from the engine. However, this has involved a difficult problem in that if, for example, the two front wheels are used as the non-driven wheels and the two rear wheels as the driven wheels, the driven wheels will not be locked by an excessive braking action since the anti-skid device will come into action with respect to the driven wheels as long as it is normally operable, whereas the non-driven wheels having no anti-skid device mounted thereat will be locked by this excessive braking force with the resultant uncontrollability of the steering wheel which may give rise to a very dangerous situation from the aspect of safe driving. Furthermore, with the driven wheels equipped with the anti-skid device there has also been a deficiency in that if the tire torque TT is excessively small or none at all, the reaction force produced by a road surface with which the wheels are in contact will be too small to re-apply a turning effort to the wheels even though the braking force applied to the wheels has been forcibly reduced and thus locking of the driven wheels will result. Such an inconvenience will cause locking of wheels even if the braking force is released, that is, when the brakes are applied in combination with the so-called engine braking such as will be the case when a vehicle equipped with a fluid-type automatic transmission is running in the low range or a vehicle equipped with a speed change gear is running, with the low gear being engaged and the clutch in the coupling position, on a road surface where the friction coefficient between the wheels and the road surface is exceedingly small, even if the braking force applied to the wheels is forcibly reduced by the anti-skid device so as to release the braking torque, the restraining torque developed by the engine braking force still remains acting on the wheels, so that no tire torque TT large enough to overcome the constraining torque produced by the engine braking to apply a turning effort to the wheels can be developed owing to the small friction coefficient between the wheels and the road surface and thus the locking of the wheels will result in spite of the braking force being reduced. On the other hand, with a vehicle running on a bad road such as a gravel road, if the braking force is being applied to the wheels at the time that the wheels take off the road surface for some reason or other during the braking operation, the locking of the wheels will readily result since no reaction force from the road surface, i.e., tire torque TT can be obtained. In either of the aforesaid cases, there is a defect in that once the wheels are locked, no peripheral wheel deceleration and peripheral wheel speed may appear, that is, no signal for reducing the braking force may be produced, thus inducing so-called skidding in which the vehicle skids with the wheels locked.

With these conventional devices there is a still further problem in that since the peripheral wheel deceleration represents neither the friction coefficient $\mu$ between the tires and a road surface nor the wheel slip factor S, while the braking force may be controlled ideally on some road surfaces where the friction coefficients come within a certain range, such an ideal control of the braking force can not be effected on other road surfaces where the range of friction coefficients is different from the former, so that the wheels will be locked while the vehicle is still running or the braking force will be released unnecessarily thereby extending the stopping distance considerably, and these deficiencies may destroy the merit of mounting an anti-skid device in a vehicle.

The object of the present invention is to solve these deficiencies and therefore the anti-skid device according to the present invention comprises a first braking force control unit provided for non-driven wheels, and a second braking force control unit provided for driven wheels consisting in combination a first braking force control unit, a wheel speed detector, a first timer circuit and a second timer circuit. Accordingly, by using the device of the present invention the locking of wheels due to an excessive braking can be positively prevented irrespective of whether the friction coefficient of a road surface on which a vehicle is running is small or large and even when the vehicle is running on a bad road such as a gravel road.

Figure 6:
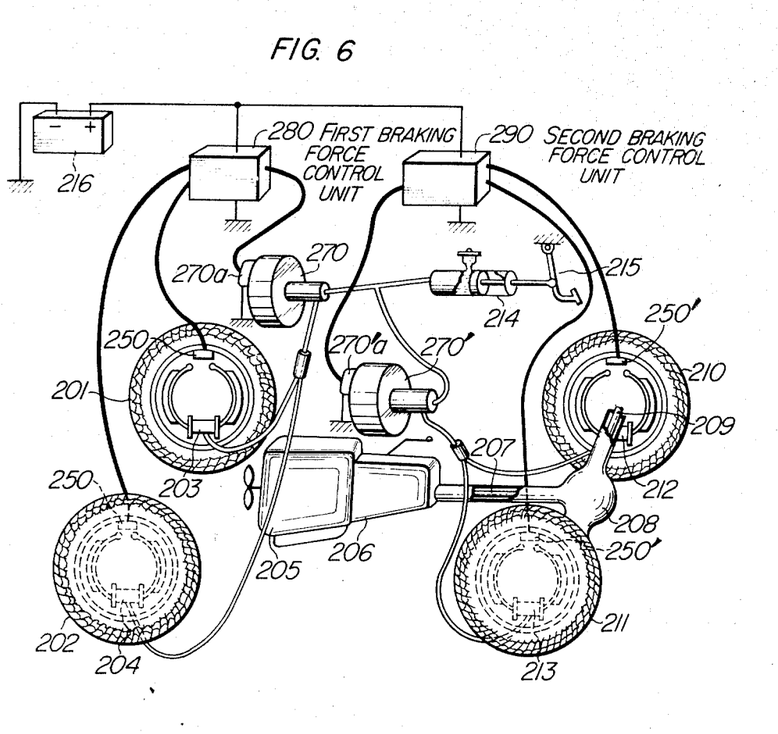
FIG. 6 is a perspective view showing the condition in which the device of the present invention is installed in a vehicle.

Firstly, an example in which the device of the present invention is installed in a four-wheeled vehicle will be explained with reference to FIG. 6, in which numerals 201 and 202 designate non-driven wheels, 203 and 204 wheel cylinders mounted at the non-driven wheels 201 and 202, respectively. Numeral 205 designates an internal combustion engine, 206 a torque converter-type or mechanical-type transmission, 207 a propeller shaft, 208 a differential gear, 209 a driven axle, 210 and 211 driven wheels. Numerals 212 and 213 designate wheel cylinders mounted at the driven wheels 210 and 211, respectively, 214 a master cylinder, 215 a brake pedal, 216 a power supply storage battery. Numeral 250 designates a generator connected to each of the non-driven wheels 201 and 202, 250' a generator mounted at each of the driven wheels 210 and 211, 270 first braking force modulator means, 270a a three-way select solenoid valve, the first braking force modulator means 270 being disposed between the master cylinder 214 and the wheel cylinders 203 and 204. Numeral 270' designates second braking force modulator means, 270'a a three-way select solenoid valve, the second braking force modulator means 270' being disposed between the master cylinder 214 and the wheel cylinders 212 and 213. Numeral 280 designates a first braking force control unit provided for the non-driven wheels 201 and 202. Numeral 290 designates a second braking force control unit provided for the driven wheels 210 and 211. It is to be noted that only one each of the generators 250 and 250' may be mounted at any one of the non-driven wheels 201 and 202 and the driven wheels 210 and 211, respectively.

With the construction described above, the operation of the braking force control unit will now be explained with reference to FIGS. 2A, 2B, 2C, 2D, 2E and 2F. In these figures, the abcissas represent the times t in corresponding relationships with one another, while the ordinates represent the wheel speed $a$ and the reference wheel speed $\beta$, in FIG. 2A; the braking torque BT and the tire torque TT, in FIG. 2B; the releasing signal produced by a differential amplifier 108, in FIG. 2C; the acceleration duration time signal of a wheel signal $a$ applied to the differential amplifier 108, in FIG. 2D; the voltage developed across a capacitor 121 upon charge and discharge thereof, in FIG. 2E; and a first preset deceleration of 1.0G and a second preset deceleration of 0.2G, in FIG. 2F.

Figure 2A:
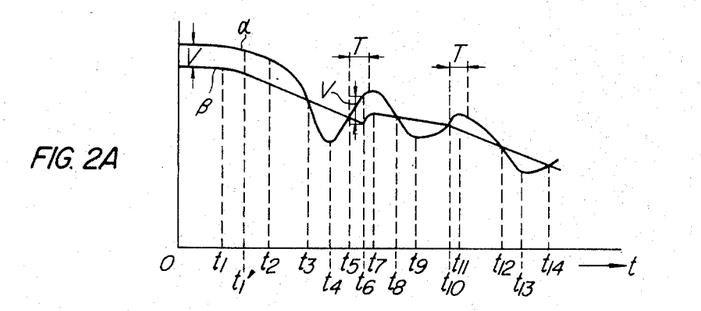
FIGS. 2A through 2F are diagrams for explaining the operating principle and the operation of a first braking force control unit incorporated in the device of the present invention.
Figure 2B:
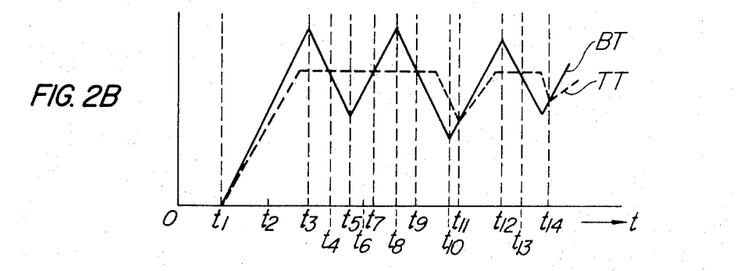

Further, $G_1$ represents a higher value of the predetermined deceleration setting and $G_2$ represents a lower value thereof. The reference wheel speed $\beta$ is so chosen that it is lower than the wheel speed $a$ by $v$ when a vehicle is running normally or no braking force is applied to the vehicle and hence the braking torque BT is zero and so, if the braking force is applied to the wheels at time $t_1$ so that the wheel speed $a$ starts to drop, the reference wheel speed $\beta$ remains at the value lower than the wheel speed $a$ by $v$ until the peripheral wheel deceleration reaches the preset deceleration $G_1$ and the instant the peripheral wheel deceleration comes to the preset deceleration $G_1$ at time $t'_1$ the reference wheel speed $\beta$ starts to drop at the rate of the preset deceleration $G_1$. Then, as the decreasing wheel speed $a$ becomes lower than the reference wheel speed $\beta$ at time $t_3$, the braking torque BT is caused to decrease as shown in FIG. 2B. This causes the wheel speed $a$ to rise so that when it becomes higher than the reference wheel speed $\beta$ at time $t_5$ the braking torque BT is caused to rise as shown in FIG. 2B. Thereafter, as the wheel speed $a$ continues to rise and reaches at time $t_6$ a value which is higher than the reference wheel speed $\beta$ just by an amount of $v$, the relationship between the reference wheel speed $\beta$ and the wheel speed $a$ becomes identical to that which takes place between time $t_0$ and $t_2$. As the braking torque BT rises further, the wheel speed $a$ starts to decrease. In this case, if the wheel speed $a$ is still rising, i.e., if it is on the increase after a time T during which the braking torque BT is rising starting at time $t_5$, the subsequent preset deceleration will be changed to the lower value $G_2$, while the subsequent preset deceleration will be maintained at the previous higher value $G_1$ to repeat the aforesaid process of operations if the wheel speed $a$ is decreasing, i.e., if it is on the decrease. The predetermined definite time T may be suitably determined in consideration of the gradient with which the braking torque BT will be increased.

Repetitions of the aforesaid process control the wheels at a value near the peak point X of the $\mu$-S curve shown in FIG. 1 thereby accomplishing the purpose of the anti-skid device, that is, the vehicle can be safely stopped by preventing the locking of wheels and eliminating uncontrollability of the steering wheel and spinning of the vehicle body without extending the stopping distance.

While the preset deceleration is changed between the higher value $G_1$ and the lower value $G_1$ in the foregoing explanation, the same purpose can also be accomplished by an arrangement wherein a plurality of levels of the preset deceleration are generally predetermined such that if the wheels are being accelerated at the lapse of the definite time T after the braking torque BT starts to rise again at a certain time following the releasing operation of the braking force the preset deceleration may be changed to the next lower value, while the preset deceleration may be changed to the next higher value if the wheels are being decelerated.

Furthermore, the same purpose can also be accomplished by means of a system in which the reference wheel speed $\beta$ is not employed, but the braking force is controlled in a direction to increase the wheel speed $a$ if the wheels are being accelerated at the expiration of the definite time T after the braking torque BT has started to rise, while the braking force is controlled in the direction to decrease the wheel speed $a$ if the wheels are being decelerated.

Next, the reasons why the tire torque TT can be controlled at near the peak point X of the $\mu$-S curve shown in FIG. 1 by the aforementioned process will be explained hereunder.

With the wheels under braking operation, the following relation holds between the braking torque BT and the tire torque TT:

BT = TT + (the torque due to the inertia of the wheel) In other words, the difference between the braking torque BT and the tire torque TT is proportional to the deceleration or acceleration of the wheel.

Consequently, the aforementioned process may be represented as shown in FIG. 2B in terms of the relationship between the braking torque $BT$ and the tire torque $TT$. In other words, the wheel will be on the deceleration if the braking torque $BT$ is larger than the tire torque $TT$, while the wheel will be on the acceleration if the former is smaller than the latter. Now assuming that the application of the braking torque $BT$ is initiated at time $t_1$ so that the wheel speed $a$ is decreased, the tire torque TT rises starting at a point which is as low as proportional to the wheel deceleration and it increases in the direction of an arrow a in the $TT$-S curve of FIG. 1. Then, as the wheel speed $a$ becomes lower than the reference wheel speed $\beta$ at time $t_3$, this causes the braking torque BT to decrease. The wheel speed $a$ continues to decrease until time $t_4$ so that the tire torque $TT$ traces in the direction of the arrow a along the $TT$-S curve in FIG. 1. As the braking torque BT decreases further so that the wheel speed $a$ starts to rise at time $t_4$, it eventually gets higher than the reference wheel speed $\beta$ at time $t_5$, whereupon the braking torque BT starts to rise. During the time interval between $t_4$ and $t_7$ the wheel remains in the state of being accelerated. The tire torque $TT$ traces in the direction of an arrow b along the $TT$-S curve in FIG. 1 and it rapidly decreases after passing through the peak point X. If the slip factor S is large at time $t_5$, this indicates that the tire torque TT has not decreased in spite of a decrease in the braking torque BT thus making the time interval between time $t_5$ and time $t_7$ longer. In other words, with the value of the definite time T being chosen suitably, if the wheel happens to be in the state of being accelerated at the expiration of the definite time T after the braking torque BT is started to increase at time $t_5$, this indicates that the value of the slip factor S at this time is larger than that at time $t_5$ and that it is necessary to change the subsequent preset deceleration to the lower value to reduce the rate of decrease of the wheel speed $a$ thereby causing the slip factor S to become smaller. After repetitions of this process, if the slip factor S is small at time $t_{10}$, the preset deceleration must be changed to the higher value to increase the rate of decrease of the wheel speed $a$ so that the slip factor S may tend to increase, since the tire torque TT has been on the decrease by this time thereby reducing the time between time $t_{10}$ at which the braking torque BT has started to rise and $t_{11}$ at which the wheel speed $a$ will be decelerated again and hence the wheel will be decelerated again at the expiration of the definite time T after $t_{10}$. In the foregoing explanation, the process is related only to the difference between the braking torque BT and the tire torque TT, that is, the state of acceleration or deceleration of the wheel and thus it has no direct relation with the absolute value of the tire torque TT. In other words, the tire torque TT is controlled by always obtaining its value which is hear the peak point X of the $\mu$-S curve of FIG. 1, so that an ideal anti-skid control can be accomplished on road surfaces of all kinds of the friction coefficients $\mu$.

In summary, the operating principle of the present invention described above is such that the preset deceleration of the reference wheel speed is changed depending on whether the wheel is being accelerated or decelerated at the expiration of a predetermined definite time after a time at which the reapplication of the braking force is initiated following the previous braking force reducing operation, whereby the tire torque $TT$ is controlled at a value near the peak point X of the $\mu$-S curve and thus the braking force is controlled on the basis of this peak point so as to always apply an ideal braking torque $BT$ to the wheels without inducing locking of the wheels.

Figure 3:
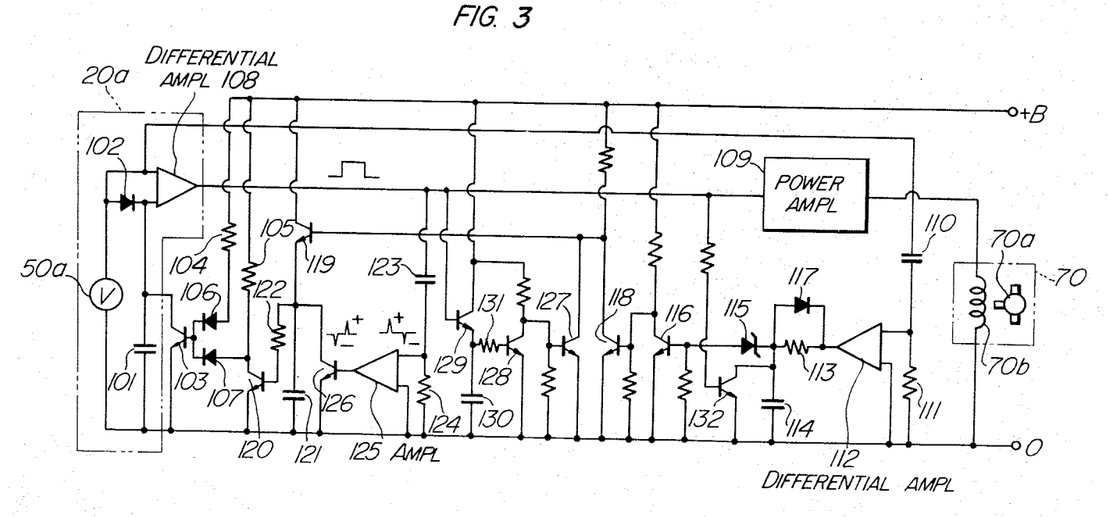
FIG. 3 is an electrical wiring diagram showing an embodiment of the principal part of the first braking force control unit in the device of the present invention.

Referring now to FIG. 3 illustrating the first braking force control unit, numeral 20a designates a locking detector, 50a a DC generator connected to the axle of a non-driven wheel and constituting a wheel speed voltage generator for generating a wheel speed voltage corresponding to the wheel speed. This DC generator 50a may be replaced by the combination of an AC generator and a rectifier circuit, the combination of a pulse generator and a D-A conversion circuit or the like without departing from the scope of the present invention. Numeral 101 designates a capacitor charged by the wheel speed voltage from the DC generator 50a, 102 a diode for preventing the stored charge in the capacitor 101 from flowing back to the DC generator 50a, 103 a transistor adapted to discharge the stored charge in the capacitor 101 with a time constant corresponding to a predetermined deceleration setting of 1.0G (where G is the acceleration due to gravity), for example, so that a voltage is produced across the capacitor 101 which corresponds to the reference wheel speed that decreases with the predetermined deceleration (this capacitor voltage will be simply referred to as the reference wheel speed voltage). Numerals 104 and 105 designate resistors which determine the base current, that is, the collector current of the transistor 103 and hence the aforesaid preset deceleration, that is, the discharging time constant of the capacitor 101, 106 and 107 diodes for preventing the currents flowing through the resistors 104 and 105 from interfering with each other. A reference wheel speed voltage generator is constituted by the capacitor 101, diode 102, transistor 103 and resistors 104 and 105. Numeral 108 designates a first differential amplifier for comparing the wheel speed voltage from the DC generator 50a and the reference wheel speed voltage across the capacitor 101, whereby it generates a first braking force releasing signal when the former voltage becomes lower than the latter, while this first releasing signal is not generated or extinguished when the former voltage is higher than the latter. Numeral 109 designates a power amplifier for amplifying the power of the first releasing signal from the differential amplifier 108 to a level large enough to actuate a first braking force modulator means 70 whose driving source comprises a three-way select solenoid valve 70a. Numeral 70b designates the electromagnet coil of the three-way select solenoid valve 70a and the energization of this electromagnet coil 70b actuates the three-way select solenoid valve 70a so that the first braking force modulator means 70 functions in such a manner that the connection between a master cylinder and wheel cylinders mounted at the non-drivens wheel is shut off and the hydraulic pressures upon the wheel cylinders are decreased by the increased volume of the chamber comprising a cylinder and a piston. Numerals 110 and 111 designate a capacitor and a resistor, respectively, which constitutes a differentiation circuit for detecting the time derivative of the wheel speed voltage, i.e., the acceleration or deceleration of the wheel speed, that is, it detects whether the wheel is being accelerated or decelerated. Numeral 112 designates a second differential amplifier for making a comparison between the zero potential and the time derivative of the wheel speed voltage detected by the differentiation circuit comprising the capacitor 110 and the resistor 111, whereby when this time derivative is positive, i.e., an acceleration signal a positive output voltage (+B[V]) will be generated, while a zero (0 [A]) or negative output voltage will be generated if the time derivative is negative, i.e., a deceleration signal. In this embodiment the power supply voltage is +B [V]. Numerals 113 and 114 designate a resistor and a capacitor, respectively, constituting an integration circuit which in turn forms a timer circuit, whereby when the output voltage of the differential amplifier 112 reaches to +B [V] upon application of an acceleration signal thereto and at the same time this acceleration signal remains on in excess of a definite time of 100 milliseconds, for example, which depends on the time constant determined by the resistor 113 and the capacitor 114 and the Zener voltage of a reference diode 115, a current is supplied to the base of a transistor 116 by way of the reference diode 115 to thereby render the transistor 116 conductive, whereas when the duration of the acceleration signal applied to the differential amplifier 112 is shorter than the aforesaid definite time, the stored charge in the capacitor 114 is discharged through the circuit leading to the ground by way of the diode 117 and through the inside of the differential amplifier 112, thereby preventing the capacitor 114 from exerting any effect on the aforesaid definite time when another acceleration signal is applied to the differential amplifier 112. Numerals 118, 119 and 120 designate transistors adapted to operate in the switching mode along with the transistor 116, so that when the application of the acceleration signal to the differential amplifier 112 lasts longer than the definite time, the transistor 118 is cut off upon conduction of the transistor 116 and the transistor 119 conducts as the power supply voltage +B [V] is applied to the base thereof, thereby charging a capacitor 121 by means of the power supply voltage +B [V]. Then, as the voltage developed across the capacitor 121 becomes higher than the base cutoff voltage of the transistor 120, the transistor 120 is rendered conductive so that a current directed to the base of the transistor 103 by way of the resistor 105 now flows through the collector and the emitter of the transistor 120 with the result that the base current of the transistor 103 consists solely of the current that flows through the resistor 104 and thus it becomes smaller than would be the case when the transistor 103 is supplied through both of the resistors 104 and 105 and its collector current also decreases accordingly. In other words, the discharging time constant of the capacitor 103 becomes longer, that is, the preset deceleration of the reference wheel speed is changed from the initially set first value of 1.0G (hereinafter referred to as the first preset deceleration) to a second preset deceleration of 0.2G, for example. Provision is also made such that even after the transistor 119 has been cut off, the transistor 120 is supplied with the discharging current from the capacitor 121 at the base thereof to maintain its conduction state for a period of time determined by the time constant of the capacitor 121 and the resistor 122 and at the expiration of this time the transistor 120 is cut off, thereby changing the preset deceleration of the reference wheel speed from the second preset deceleration of 0.2G back to the first preset deceleration of 1.0G. A time constant setting means is constituted by the transistors 116, 118, 119 and 120, capacitor 121 and a releasing signal hold circuit which will be explained later. Numerals 123 and 124 designate a capacitor and a resistor, respectively, which constitute a differentiation circuit, 125 an amplifier for amplifying the output of this differenciation circuit, the amplifier 125 and the differentiation circuit comprising the capacitor 123 and the resistor 124 being adapted to produce a positive pulse signal when the first releasing signal generated by the differential amplifier 108 is terminated. Numeral 126 designates a transistor which is so designed that when the positive pulse signal from the amplifier 125 is applied to the base of the transistor 126, it is rendered conductive to rapidly discharge the stored charge in the capacitor 121 through the collector and emitter section thereof so that the transistor 120 is cut off, thereby changing the preset deceleration of the reference wheel speed from the second preset deceleration of 0.2G back to the first preset deceleration of 1.0G. The circuit constituted by the transistors 127, 128 and 129 is the releasing signal hold circuit which is provided for the purpose of eliminating an inconvenience in which, if the acceleration or deceleration of the wheel speed occurs under normal conditions when the first releasing signal will not be generated, as previously explained, the transistor 116 is rendered conductive and the transistor 118 is cut off so that the power supply voltage +B appears across the capacitor 121 to change the preset deceleration of the reference wheel speed to the second preset deceleration of 0.2G, that is, the preset deceleration of the reference wheel speed might be changed to the second preset deceleration under normal condition without any first releasing signal having been generated; and the transistor 127 constitutes an AND circuit together with the transistor 118. Numeral 130 designates a capacitor, 131 a resistor. When the deceleration of the wheel speed becomes larger than the first preset deceleration, 1.0G, of the reference wheel speed so that the differential amplifier 108 generates a first releasing signal, this signal is applied to the base of the transistor 129 which is then rendered conductive to charge the capacitor 130 up to the power supply voltage +B [V], whereby when the voltage developed across the capacitor 130 exceeds the base cutoff voltage of the transistor 128, the transistor 128 is rendered conductive and the transistor 127 is cut off. Then, even after the first releasing signal has been terminated and the transistor 129 has been cut off, the transistor 128 is supplied with the discharging current from the capacitor 130 at the base therefore, so that the transistor 128 remains in its conduction state for a definite period of time, such as of the order of 0.5 seconds which is determined by the time constant of the capacitor 130 and the resistor 131, while the transistor 127 also maintains its cutoff state during the aforesaid definite time. In this manner, the transistors 119 and 120 are rendered conductive only when both of the transistors 118 and 127 are in their cutoff states. In other words, even when the transistor 118 has been cut off, a current directed to the base of the transistor 119 flows through the collector and the emitter of the transistor 127 so far as the transistor 127 is in the conduction state, so that the transistor 119 is not permitted to conduct and thus the preset deceleration of the reference wheel speed maintains its first preset deceleration of 1.0G, while the transistors 119 and 120 are rendered conductive to change the preset deceleration of the reference wheel speed from the first preset deceleration of 1.0G to the second preset deceleration of 0.2G only when an acceleration signal applied to the differential amplifier 112 remains on for more than the definite time while the transistor 127 remains in the nonconducting state for a fixed time as determined by the time constant of the capacitor 130 and the resistor 131 after the differential amplifier 108 has generated the first releasing signal. Thus, the second preset deceleration of 0.2G is not permitted to occur under normal conditions.

Figure 2C:
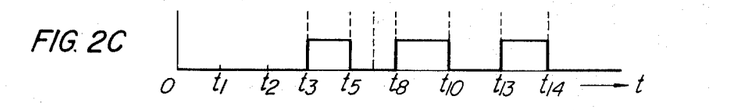
Figure 2D:
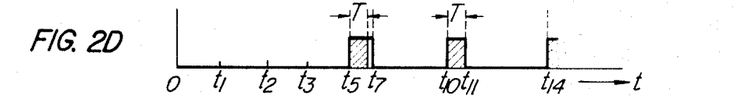
Figure 2E:
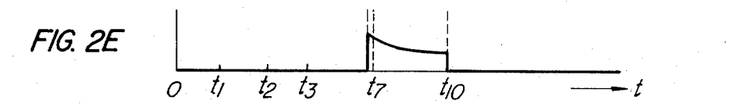
Figure 2F:
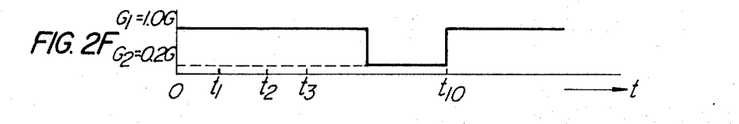

Next, the operation of the first braking force control unit will be explained. During normal driving of the vehicle, the wheel speed voltage from the DC generator 50a connected to the non-driven wheel charges the capacitor 101 by way of the diode 102. The reference wheel speed voltage developed across the capacitor 101 is lower than the wheel speed voltage by a value corresponding to the forward voltage drop across the diode 102 (corresponding to $v$ in FIG. 2A), so that the differential amplifier 108 produces no first releasing signal. Then, as the brakes are applied at time $t_1$ in FIG. 2A so that the wheel start to decelerate and eventually the wheel deceleration becomes larger than the first preset deceleration, 1.0G, of the reference wheel speed at time $t_2$, the capacitor 101 starts to discharge, with the voltage then appearing thereacross as an initial speed voltage, at the rate of the first preset deceleration of 1.0G and then, as the wheel speed voltage from the DC generator 50a becomes lower than the reference wheel speed voltage developed across the capacitor 101, the differential amplifier 108 generates its first releasing signal (positive signal) as shown in FIG. 2C and this signal, after being amplified by the power amplifier 109, is applied to the electromagnet coil 70b of the three-way select solenoid valve 70a. When this happens, the hydraulic pressure at the wheel cylinders, that is, the braking force applied to the wheel is forcibly reduced, therebydecreasing the braking torque BT. Whereupon, the wheel speed $a$ starts to rise as it is assisted by the tire torque TT provided by the road surface by virtue of the forward movement of the vehicle due to the inertia of the vehicle body. It is to be noted here that even after the first releasing signal has been generated at time $t_3$ in FIG. 2A the wheel speed $a$ continues to decrease until time $t_4$, because there is a delay in the operation of the three-way select solenoid valve 70a etc. so that the hydraulic pressure is not reduced to zero pressure instantaneously with the generation of the first releasing signal, but the hydraulic pressure at the wheel cylinders are reduced at a finite gradient of fall of the hydraulic pressure. Then, at the same time that the wheel speed $a$ rises due to the generation of the first releasing signal the wheel speed voltage also starts to build up at time $t_4$, so that when the wheel speed voltage subsequently exceeds the reference wheel speed voltage at time $t_5$, the first releasing signal from the differential amplifier 108 is terminated. In this connection, the first releasing signal remains on as long as the wheel speed voltage is lower than the reference wheel speed voltage. With the first releasing signal now terminated, a pulse voltage with a negative polarity is produced at the ungrounded side of the resistor 124 in the differentiation circuit comprising the capacitor 123 and the resistor 124 and the amplifier 125 generates a positive output pulse which is applied to the transistor 126, whereupon the transistor 126 is rendered conductive and the capacitor 121 rapidly discharges, if any, its stored charge through the collector and the emitter of the transistor 126. In this case, as previously explained, should the slip factor S at time $t_5$ assume a value higher than the value at the peak point X of the $\mu$-S curve shown in FIG. 1, it will require a longer time for the value of the slip factor S to exceed the peak point X, that is, the duration of wheel rise time will be longer, so that while the charging rate and the charging voltage of the capacitor 101 are low, a longer time is required for charging it and thus, as shown in FIG. 2D, the duration time of an acceleration signal applied to the differential amplifier 112 becomes longer than a predetermined definite time T (e.g. 100 milliseconds) as determined by the time constant of the resistor 113 and the capacitor 114 and the Zener voltage of the reference diode 115, and a current is supplied to the base of the transistor 116 to thereby conduct the transistor 116 and cut off the transistor 118. On the other hand, as previously explained, the generation of the first releasing signal causes the transistor 127 to maintain its nonconducting state for a predetermined definite time of 0.5 seconds, for example, depending on the time constant of the capacitor 130 and the resistor 131 and in this case the time interval between the rising of the wheel speed and the time at which the transistor 118 will be cut off is 100 milliseconds, the transistor 118 is rendered conductive when the transistor 127 is in its cutoff state, thereby charging the capacitor 121 as shown in FIG. 2E. This conducts the transistor 120, thereby changing the preset deceleration of the reference wheel speed from the first deceleration of 1.0G to the second preset deceleration of 0.2G as shown in FIG. 2F. This second preset deceleration will be terminated, as previously explained, at time $t_{10}$ at which the releasing signal produced at time $t_8$ will be terminated.

Next, assuming that the slip factor S at time $T_{10}$ takes a value very close to the value at the peak point X of the $\mu$-S curve in FIG. 1, then the time interval between time $t_{10}$ and time $t_{11}$ at which the wheel speed starts to decrease again will be shorter, that is, the wheel speed will rise gradually ending its rise after a short period of time, so that the duration time of an acceleration signal applied to the differential amplifier 112 never exceed the definite time T as shown in FIG. 2D and therefore the preset deceleration of the reference wheel speed will not be allowed to change from the first preset deceleration of 1.0G to the second preset deceleration of 0.2G.

Figure 4:
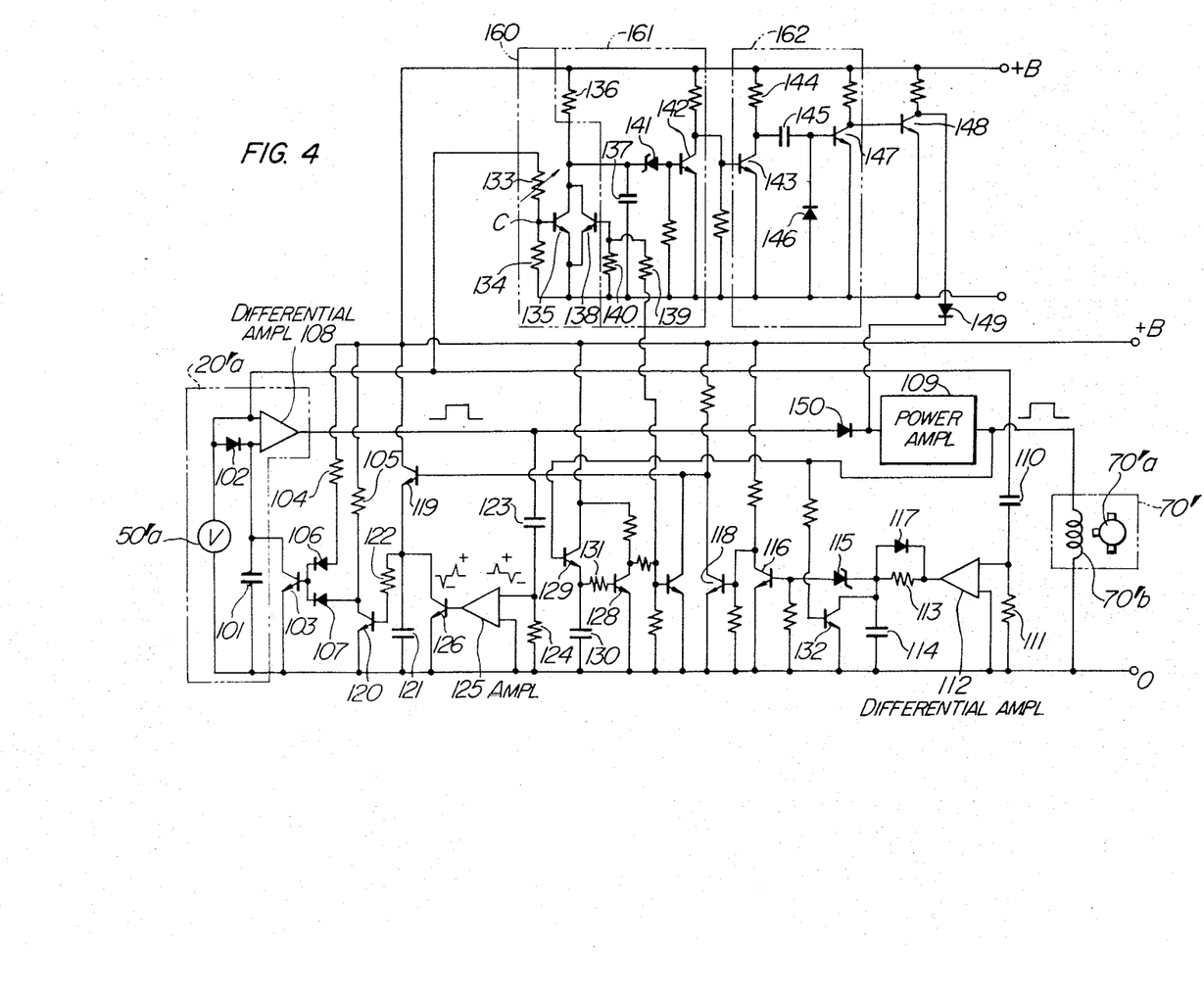
FIG. 4 is an electrical wiring diagram showing an embodiment of a second braking force control unit incorporated in the device of the present invention.

Separate from the braking force control unit described above, a second braking force control unit is provided for driven-wheels which are driven from the internal combustion engine and, as shown in FIG. 4, this second braking force control unit comprises in combination a first braking force control unit and first and second timer circuits. In FIG. 4, the like component parts identical in their operations with those of the above described braking force control unit are designated by the like reference numerals as used in FIG. 3; and numeral 20'a designates a second locking detector, 50'a a DC generator, the second locking detector 20'a producing a portion of a second braking force releasing signal in the similar manner as with the first locking detector 20a in the previous braking force control unit. Numeral 70' designates second braking force modulator means, 70'a a three-way select solenoid valve, 70'b an electromagnet coil whose energization actuates the second braking force modulator means 70' in the similar manner as the first braking force modulator means 70 to forcibly reduce the hydraulic pressure at the wheel cylinders which are mounted at the driven wheels. Numerals 133 through 150 designate those circuit elements which are added to the first braking force control unit. More particularly numerals 133 and 134 designate a variable resistor and a resistor, respectively, which constitute a voltage dividing circuit for dividing the wheel speed voltage. Numeral 135 designates a transistor for comparing the divided voltage of the wheel speed voltage developed across the junction point C of the variable resistor 133 and the resistor 134 and the voltage between the base and the emitter of the transistor 135 to thereby detect whether the wheel speed voltage is higher or lower than a predetermined constant speed (a voltage value corresponding to 5 Km/h in wheel speed equivalent), the variable resistor 133, resistor 134 and transistor 135 constituting a wheel speed detector. Numeral 136 designates the collector load resistor of the transistor 135 which is combined with a capacitor 137 to constitute a first timer circuit. Numeral 138 designates a transistor constituting an AND circuit together with the transistor 135, the base of the transistor 138 being connected by way of its base resistors 139 and 140 to the collector of the transistor 128 in the previously mentioned memory circuit. Numeral 141 designates a reference diode, 142 an amplifying transistor, 143 a phase inverting transistor. Numeral 144 designates a resistor constituting a second timer circuit with a capacitor 145, 146 a diode for discharging the charge stored in the capacitor 145, 147 an amplifying transistor, 148 a phase inverting transistor. Numerals 149 and 150 designate diodes which constitute an OR circuit for energizing the electromagnet coil 70'b whenever either of the differential amplifier 108 or the transistor 148 produces a signal. Numeral 160 designates the wheel speed detector, 161 the first timer circuit, 162 the second timer circuit.

The operation of a first embodiment of the second braking force control unit will be explained with reference to FIG. 4, but the operation of the circuits in the second braking force control unit which are identical in operation with those parts of the first braking force control unit (i.e., the circuits designated by the same reference numerals) will not be explained. However, the second locking detector 20'a in the second braking force control unit produces a second braking force releasing signal with respect to the driven wheels. With the wheel speed being higher than a predetermined value of 5 Km/h, for example, if an excessive braking torque BT is suddenly applied to the driven wheels so that the wheel speed becomes lower than the reference wheel speed, the differential amplifier 108 produces a second releasing signal. This conducts the transistor 128 in the memory circuit so that the transistor 128 maintains its conduction state for a definite time interval as determined by the time constant of the capacitor 130 and the resistor 131, while the conduction of the transistor 128 cuts off the transistor 138. In this case, the value of the voltage across the junction point C of the variable resistor 133 and the resistor 134 at which the transistor 135 can conduct, is so chosen that it corresponds to the aforesaid predetermined wheel speed of 5 Km/h and so the transistor 135 is conducting. In this condition, if the wheel speed drops below 5 Km/h, the transistor 135 is cut off and the capacitor 137 is charged by way of the resistor 136 with the time constant as determined by them. Then, as the voltage across the capacitor 137 becomes higher than the breakdown voltage of the reference diode 141 plus the voltage between the base and the emitter of the transistor 142, the reference diode 141 and the transistor 142 are rendered conductive. In other words, the transistor 142 conducts only when the wheel speed becomes lower than 5 Km/h and this condition continues for more than a definite time interval $T_1$ which is determined by the charging time constant of the capacitor 137, the breakdown voltage of the reference diode 141 and the voltage between the base and the emitter of the transistor 142. However, if the wheel speed remains below 5 Km/h less than the aforesaid definite time $T_1$, the transistor 135 will be rendered conductive before the voltage across the capacitor 137 builds up to a value sufficient to conduct the reference diode 141 and the transistor 142, so that the stored charge in the capacitor 137 will be discharged through the collector and the emitter of the transistor 135 and thus the transistor 142 will not conduct at this time.

The process as described above can take place irrespective of whether the differential amplifier 108 generates a braking force releasing signal and, as described above, the transistor 142 conducts when the wheel speed remains below 5 Km/h more than the definite time $T_1$ and the transistor 143 is cut off. When this happens, the transistor 147 conducts for a definite time interval $T_2$ such as 0.2 seconds as determined by the time constant of the resistor 144 and the capacitor 145, while the transistor 148 remains at cutoff during this definite time $T_2$, so that a signal is applied to the power amplifier 109 only during this particular time interval to thereby energize the electromagnet coil 70'b of second braking force modulator means 70' to forcibly reduce the braking force applied to the driven wheels. In this manner, the braking force applied to the driven wheels is forcibly reduced only for a definite time interval, such as 0.2 seconds considering that the locking of the wheels has occurred when the wheel speed below 5 Km/h continues in excess of the definite time $T_1$. In this case, the extension of stopping distance corresponding to this period of 0.2 seconds will be of the order of 10 cm. On the other hand, the braking force can be normally applied to the non-driven wheels by depressing the brake pedal so long as the differential amplifier 108 has issued no first releasing signal.

In this connection, with those devices in which a braking force releasing signal is generated during a definite time interval $T_2$ upon detection of the actual locking of wheels, any desired build-up of rotation of the wheel cannot be expected since the time of generation of the releasing signal will be belated and there will be a delay in the operation of braking force modulator means etc. However, according to the present invention, as described above, when the wheel speed remains below 5 Km/h for more than the definite time interval $T_1$, a releasing signal is generated only during the definite time interval $T_2$ anticipating that the locking of wheels is most probable, and thus the present invention is quite superior in preventing the locking of wheels.

The purpose of setting the time interval $T_2$ is to eliminate an inconvenience which may be otherwise encountered, that is, a possibility that the braking force may be reduced during the definite time $T_2$ even when the wheel speed momentarily drops below a preset wheel speed owing to any external noises. That is, this definite time $T_1$ is provided to determine whether the falling of the wheel speed below the preset speed is a true fall in the wheel speed caused by the depression of the foot brake or engine braking, or alternatively it is due to an external noise. For this reason, the duration of the definite time $T_1$ may be suitably selected in consideration of the setting requirements, such as the response characteristics of anti-skid devices and the set speeds (e.g., 5 Km/h).

Of course, the intended object of the present invention can be achieved by a simple method in which the definite time $T_1$ is selected to be zero so that a releasing signal may be generated for the definite time $T_2$ whenever the wheel speed drops below a predetermined speed even for a moment. This reducing of the time interval $T_1$ to zero permits substantially the elimination of a timer (memory) circuit from the electric circuitry, thereby achieving enhanced utility of the present invention from the technical or economical point of view.

The above described operation of the device of the present embodiment can be equally performed with respect to the non-driven wheels.

Figure 5:
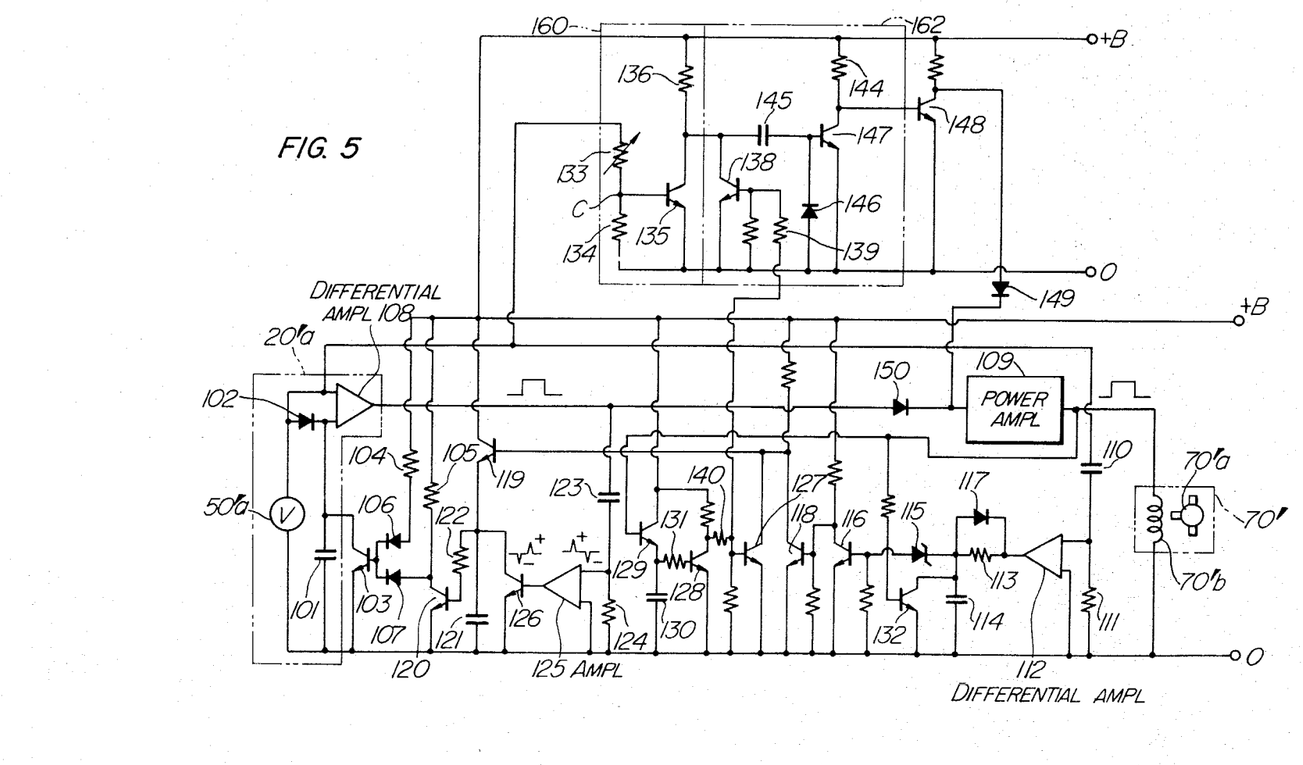
FIG. 5 is an electrical wiring diagram showing another embodiment of the second braking force control unit in the device of the present invention.

Referring now to FIG. 5, there is shown another embodiment of the second braking force control unit which is similar to the device of FIG. 4 excepting that the time delay $T_1$ of the first timer circuit is zero.

In operation, if the wheel speed becomes lower than 5 Km/h, a transistor 135 is cut off and at this time a transistor 138 is in its non-conducting state as previously explained with reference to the operation of the device of FIG. 4, so that both of the transistors 135 and 138 are non-conducting, that is, the logical product is obtained. When this happens, a transistor 147 is rendered conductive for a definite time interval of 0.3 seconds, for example, depending on the time constant of a resistor 136 and a capacitor 145 and a transistor 148 remains non-conducting during this definite time interval, thereby applying a signal (a third releasing signal) to a power amplifier 109. Namely, this third releasing signal is applied to the power amplifier 109 where it is amplified and the thus amplified signal is then supplied to an electromagnet coil 70'b of a three-way select solenoid valve 70'a in a second braking force modulator means 70'. Whereupon, the second braking force modulator means 70' is actuated to reduce the hydraulic pressure at the wheel cylinders mounted at the driven wheels. Simultaneously, the third releasing signal amplified by the power amplifier 109 conducts a transistor 129 to charge a capacitor 130. Thereafter, if the wheel speed rises above 5 Km/h, the transistor 135 is turned on and the transistor 147 is cut off so that the transistor 148 is rendered conductive to terminate the third releasing signal, thereby rapidly discharging the stored charge in the capacitor 145 by way of a discharging circuit comprising the collector and the emitter of the transistor 135 and the diode 146. Still thereafter, if the braking torque $BT$ builds up so that the wheel speed drops below 5 Km/h, the transistor 135 is cut off again and, since the transistor 138 has been cut off by this time, another third releasing signal is generated. On the other hand, with the transistor 138 being cut off during the definite time interval determined by the time constant of the capacitor 130 and the resistor 131, if the driven wheels are locked for some reason or other in spite of the fact that a second releasing signal has been generated by a differential amplifier 108, a third releasing signal is generated for 0.2 seconds so that the driven wheels will start rotating by virtue of the tire torque $TT$ produced by the road surface during this period of 0.2 seconds. In this case, since the locking of wheels will start at low wheel speeds, the required extension of stopping distance corresponding to this period of 0.2 seconds will be of the order of 10 cm.

It should be understood that the present invention can also be applied to those anti-skid devices incorporating the following locking detectors as their first and second locking detectors:

i. An anti-skid device incorporating locking detectors adapted to detect speeds of both the wheel and the vehicle body such that the performance of excessive braking on the non-driven wheels and the driven wheels may be detected from these two speeds on the basis of predetermined set values to thereby produce braking for releasing signals.

ii. An anti-skid device incorporating locking detectors adapted to detect the peripheral wheel deceleration such that when the peripheral wheel deceleration reaches predetermined values, that is, when the performance of excessive braking on the non-driven wheels and the driven wheels are detected, braking force releasing signals may be produced.

iii. An anti-skid device incorporating locking detectors adapted to detect both the peripheral wheel deceleration and the vehicle body deceleration such that the performance of excessive braking on the non-driven wheels and the driven wheels may be detected from the two decelerations on the basis of predetermined values to thereby produce braking force releasing signals. In addition to the anti-skid devices described in (i), (ii) and (iii), the present invention can be applied to all anti-skid devices incorporating those locking detectors adapted to detect the performance of excessive braking on the non-driven wheels and the driven wheels on the basis of predetermined values to thereby produce braking force releasing signals.

It is now evident from the foregoing that the second embodiment illustrated in FIG. 5 has a remarkable effect in that since the non-driven wheels are provided with a first braking force control unit comprising a first locking detector for detecting the performance of excessive braking on the non-driven wheels to produce a first releasing signal for reducing the braking force and first braking fore modulator means for receiving the first releasing signal to reduce the braking force, even when excessive braking is applied on the non-driven wheels which are not driven from the internal combustion engine, the locking of non-driven wheels may be positively prevented by means of a very simple circuit construction on all kinds of road surfaces with friction coefficients varying considerably from high to low values, that is, since no constraining torque due to the internal combustion engine is applied to the wheels even when the transmission of the vehicle is in the low range or low gear, no complicated circuit construction such as that of the second braking force control unit will be required to achieve the desired effect. There is another remarkable effect in that since the driven wheels are provided with a second braking force control unit comprising a second locking detector for detecting the performance of excessive braking on the driven wheels to produce a second braking force releasing signal, a memory circuit for storing the second releasing signal for a predetermined time to produce an output signal during this predetermined time, a wheel speed detector for producing an output signal upon detecting that the wheel speed is below a predetermined constant speed, and AND circuit for producing an output signal when both of the wheel speed detector and the memory circuit produce their output signals, a timer circuit for limiting the output signal from the AND circuit within a predetermined time to produce a third releasing signal, a circuit for causing the memory circuit to store the third releasing signal, and a second braking force modulator means for reducing the braking force upon receiving the second releasing signal and the third releasing signal, even when an excessive braking is performed on the driven wheels which are driven from the internal combustion engine under the condition that the transmission of the vehicle is in the low range or low gear and thus the wheels are subjected to the constraining torque from the engine, the braking force will be reduced by the third releasing signal from the timer circuit when the wheel speed becomes lower than a predetermined speed at which the locking of the driven wheels may be induced, thereby positively preventing the locking of the driven wheels. There is a further remarkable effect in that when the friction coefficient of a road surface is small and hence the tire torque TT produced by the road surface is excessively small and moreover the wheels stop rotating as they are overcome by the constraining torque from the internal combustion engine in spite of the fact that the second locking detector has issued a second releasing signal, the braking force applied to the driven wheels will be continuously reduced by means of a third releasing signal from the timer circuit during this predetermined time so that the wheels may be easily rotated again by virtue of the inertial forward movement of the vehicle body. There is a still further remarkable effect from the aspect of safety in that even if the third releasing signal continues to release the braking force applied to the driven wheels after the vehicle body has been brought to a stop, the braking force is still normally applied to the non-driven wheels so that there will be no danger of the vehicle running down a hill.

According to the first and second embodiments shown in FIGS. 4 and 5, there is a remarkable effect in that since each of the first and second locking detectors comprise a wheel speed voltage generator for producing a wheel speed voltage corresponding to the wheel speed, a reference speed voltage generator which is so adapted that when the rate of decrease of the wheel speed voltage reaches a predetermined deceleration a reference wheel speed voltage is generated which decreases with a function corresponding to the preset deceleration, with a speed voltage lower than the wheel speed voltage at this time being used as its initial voltage value, and a signal generator for generating a first releasing signal when the reference wheel speed voltage exceeds the wheel speed voltage, all of the effects attributable to the second embodiment as described above can be achieved and moreover the preset deceleration of the reference wheel speed can be suitably set so that the slip factor S of the wheel may be controlled at a value near the peak point X of the $\mu$-S curve, that is, a tire torque $TT$ having approximating a maximum value may be obtained under the condition where the friction coefficient $\mu$ between the wheel and a road surface is near the maximum value, whereby the wheel speed can be decreased with the preset deceleration to safely and efficiently brake the vehicle within the minimum possible stopping distance.

Figure 7:
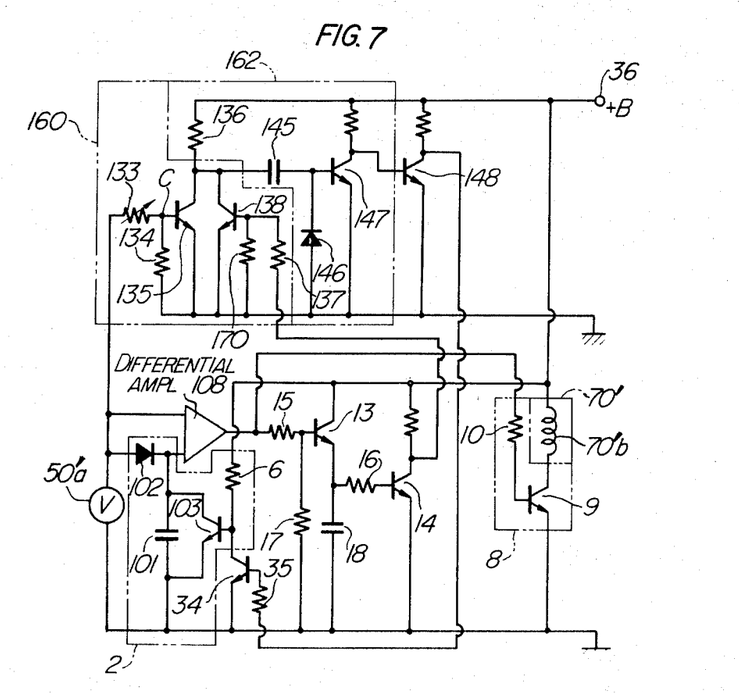
FIG. 7 is an electrical wiring diagram showing a further embodiment of the second braking force control unit in the device of the present invention.

Next, a further embodiment of the second braking force control unit will be explained with reference to FIG. 7 in which numeral 50'a designates a DC generator connected to the axle of a wheel and it constitutes a wheel speed voltage generator for generating a wheel speed voltage corresponding to the wheel speed. Numeral 2 designates a reference wheel speed voltage generator, 101 a capacitor charged by the wheel speed voltage from the DC generator 50'a, 102 a diode for preventing the stored charge in the capacitor 101 from flowing back to the DC generator 50'a. Numeral 103 designates a transistor for discharging the stored charge in the capacitor 101 with a time constant corresponding to a predetermined deceleration of 1.0G (where G is the acceleration by gravity), for example, so that a voltage appears across the capacitor 101 which corresponds to the reference wheel speed that decreases with the predetermined deceleration (this capacitor voltage will be hereinafter simply referred to as the reference wheel speed voltage). Numeral 6 designates the base resistor of the transistor 103 which determines the base current, that is, the collector current of the transistor 103 and hence the discharging time constant of the capacitor 101, that is, the aforesaid preset deceleration. Numeral 108 designates a differential amplifier constituting a releasing signal generator which compares the wheel speed voltage from the DC generator 50'a and the reference wheel speed voltage across the capacitor 101, so that a releasing signal is generated to reduce the braking force applied to the wheel so as to reduce the braking torque only when the latter voltage is greater than the former voltage. Numeral 8 designates a power amplifier for effecting the power amplification of the releasing signal from the differential amplifier 108 so that the power of the releasing signal may be made large enough to energize braking force releasing means which will be explained latter; 9 a transistor; 10 the base resistor of the transistor 9. Numeral 70' designates the aforesaid braking force releasing means showing only its electrical element which is an electromagnet coil 70'b, and this braking force releasing means 70' functions such that as the electromagnet coil 70'b is energized upon conduction of the transistor 9 of the power amplifier 8, the connection between wheel cylinders mounted at the wheels and a master cylinder operated by a brake pedal is shut off and at the same time the volume of the chamber defined by a cylinder and a piston is increased to forcibly reduce the braking oil pressure upon the wheel cylinders. Numerals 13 and 14 designate transistors for switching operations, 15 and 16 base resistors of the transistors 13 and 14 respectively, 17 a bias resistor, 18 a capacitor. Then, as the differential amplifier 108 generates a releasing signal, the transistor 13 conducts when it receives this releasing signal at the base thereof by way of the resistor 15 and thus the capacitor 18 is charged practically up to the power supply voltage +B (V), while the transistor 14 is so adapted that when the voltage across the capacitor 18 exceeds the base cutoff voltage of the transistor 14, it is rendered conductive and, even after the extinction of the releasing signal and the non-conduction of the transistor 13, the transistor 14 maintains its conduction state for a definite time such as 0.5 seconds as determined by the time constant of the capacitor 18 and the resistor 16, since the discharging current from the capacitor 18 is supplied to the base of the transistor 14. Numeral 160 designates a wheel speed detector associated with the DC generator 50'a to detect whether the wheel speed is below a predetermined value of 5 Km/h, for example, 133 a variable resistor, 134 a resistor, the two resistors 133 and 134 constituting a voltage dividing circuit for dividing the wheel speed voltage of the DC generator 50'a. Numeral 135 designates a transistor whose base-emitter voltage is compared with the divided voltage of the wheel speed voltage appearing at the voltage dividing point C of the variable resistor 130 and the resistor 134 so as to detect whether the wheel speed is below 5 Km/h. In other words, the voltage dividing ratio of the variable resistor 133 and the resistor 134 is so chosen that the voltage between the base and the emitter of the transistor 135 corresponds to the wheel speed of 5 Km/h which is to be detected. Numeral 136 designates the collector load resistor of the transistor 135.

The aforesaid predetermined wheel speed of 5 Km/h, for example, will be so set that it represents a critical wheel speed at which the constraining torque produced by the engine braking force becomes so small that it will be overcome by the tire torque. An AND circuit comprises the transistor 135 in the wheel speed detector 160 and another transistor 138, 170 and 137 the bias resistor and the base resistor of the transistor 138, respectively. The base of the transistor 138 is also connected to the collector of the transistor 14 by way of the base resistor 137. Numeral 145 designates a capacitor constituting a timer circuit with the collector load resistor 136, 146 a diode forming a part of the discharging circuit of the capacitor 145, 147 and 148 amplifying transistors. Numeral 34 designates a transistor whose collector and emitter are connected in parallel with the base and the emitter of the transistor 103 of the reference wheel speed voltage generator 2, so that when the transistor 34 conducts by virtue of a current supplied to the base thereof, the large portion of a current directed to the base of the transistor 103 by way of the base resistor 6 flows through the collector and the emitter of the transistor 34, whereupon the base current, that is, the collector current of the transistor 103 becomes very small, thereby lengthening the discharging time constant of the capacitor 101. In other words, the preset deceleration of the reference wheel speed is changed from its initially established first value of 1.0G (hereinafter simply referred to as the first preset deceleration) to a second lower preset deceleration of 0.2G, for example. The base of the transistor 34 is also connected to the collector of the transistor 148, and numeral 36 designates a power supply terminal connected to the positive terminal of a storage battery of a power supply voltage +B (V) which is installed in a vehicle.

With the construction as described above, the operation of the device according to the present invention will now be explained.

During normal driving of the vehicle, the capacitor 101 is charged by the wheel speed voltage from the DC generator 50'a by way of the diode 102. In this case, the reference wheel speed voltage developed across the capacitor 101 is lower than the wheel speed voltage by a value corresponding to the forward voltage drop across the diode 102 and therefore the differential amplifier 108 produces no braking force releasing signal, so that the braking force releasing means 70' also remains inoperative and the braking hydraulic pressure at the wheel cylinders is not reduced.

Then, with the wheel speed higher than a predetermined value of 5 Km/h, if an excessively large braking torque is suddenly applied to the wheel, a sudden deceleration of the wheel speed occurs so that when this deceleration of the wheel becomes larger than the first preset deceleration, 1.0G, of the reference wheel speed, the voltage appearing across the capacitor 101 at this time is discharged as an initial speed voltage at the rate of the first preset deceleration of 1.0G, and then as the wheel speed voltage from the DC generator 50'a becomes lower than the reference wheel speed voltage appearing across the capacitor 101, the differential amplifier 108 produces a braking force releasing signal so that at the same time that the transistor 9 of the power amplifier 8 is rendered conductive by virtue of this releasing signal applied to the base thereof the electromagnet coil 70'b of the braking force releasing means 70' is energized. This results in the actuation of the braking force releasing means 70' so that the braking hydraulic pressure at the wheel cylinders is decreased, thereby reducing the braking force applied to the wheels to decrease the braking torque. When this happens, the wheel speed starts to rise again as it is assisted by the tire torque produced by the road surface by virtue of the forward movement caused by the inertia of the vehicle body. Then, as the rising wheel speed voltage becomes higher than the reference wheel speed voltage, the releasing signal from the differential amplifier 108 vanishes.

On the other hand, when the differential amplifier 108 produces a releasing signal, this releasing signal is applied to the base of the transistor 13 so that the transistor 13 is rendered conductive and then the capacitor 18 is charged to conduct the transistor 14. The conduction of the transistor 14 cuts off the transistor 138. Under these circumstances, that is, with the releasing signal generated and the transistor 138 in its cutoff state, if the wheel speed drops below the predetermined value of 5 Km/h, the voltage across the voltage dividing point C of the variable resistor 133 and the resistor 134 becomes lower than the voltage between the base and the emitter of the transistor 135 so that the transistor 135 is cut off, that is, the logical product is obtained with the both transistors 138 and 135 being cut off. When this happens, the transistor 147 remains on for a definite time of 0.2 seconds, for example, depending on the time constant of the resistor 136 and the capacitor 145, while the transistor 148 remains in its cutoff state during this definite time. Thus, the base current is supplied from the power source to the base of the transistor 34 by way of the resistor 33 so that the transistor 34 is rendered conductive and the transistor 103 is driven into a state close to its cutoff state (not into a completely cutoff state), whereupon the discharging time constant of the capacitor 101 is made longer, that is, the preset deceleration of the reference wheel speed is changed from the first preset deceleration of 1.0G to the second preset deceleration of 0.2G only during the aforesaid definite time. This lengthens the time from the generation of a releasing signal until such a time that the increasing wheel speed voltage eventually becomes higher than the reference wheel speed voltage, that is, the time during which the releasing signal remains on will be lengthened and the braking torque applied to the wheel will remain on the decrease for a comparatively long period of time. Thus, even in the case of a braking operation associated with an engine braking, the tire torque large enough to overcome the constraining torque produced by the engine braking may be imparted to the wheels to thereby facilitate the building up of revolution of the wheels, and at the same time should the wheels take off a road surface for some reason or other when the brakes are applied on a bad road such as a gravel road the releasing of the braking force may be continued until the wheels come down to contact with the road again. Further, this series of action can equally take place even after the releasing signal has vanished, if the wheel speed drops below 5 Km/h and the transistor 135 is cut off under the condition that the transistor 14 has been in its conduction state and the transistor 138 has remained cut off during a definite time of 0.5 seconds as determined by the time constant of the resistor 16 and the capacitor 18.

It is to be understood that the present invention is not limited to the embodiments described above, since the braking system of a vehicle incorporating the present invention may consist of any kind of systems other than a hydraulic system, such as an electromagnetic system and a mechanical system and the form of braking force releasing means may differ accordingly. As for the releasing signal generator, any transistor circuits other than a differential amplifier may also perform an identical action to that of the differential amplifier. Regarding the wheel speed voltage generator, the DC generator may be replaced by a combination circuit of an AC generator and a rectifier circuit or a circuit combining a pulse generator and a D-A conversion circuit. The AND circuit is also not limited to one which solely comprises transistors, but it may also comprise diodes alone, a combination circuit of a diode and a transistor, or the like.

It is evident from the foregoing that according to the device of the above described embodiments the rate of decrease of the reference wheel speed is changed to a lower value for a predetermined interval only when the releasing signal generator has generated a releasing signal and the wheel speed detector has generated an output voltage upon detecting that the wheel speed is below a predetermined definite value, so that when a specified condition has been met, that is, when chances are greater that the wheels may be locked, the continued releasing of the braking force applied to the wheels can be maintained for a comparatively long period of time by lengthening the duration of the releasing signal, whereby even when a braking operation is performed in combination with the so-called engine braking, a tire torque large enough to overcome the constraining torque produced by the engine braking may be applied to the wheels to facilitate the rising revolution of the wheels, thereby ensuring that the wheels will not be locked by the constraining torque due to the engine braking. Furthermore, if the wheels take off a road surface for some reason or other upon application of the brakes on a bad road such as a gravel road, the braking force may be continuously released until the wheels come down on the road again to prevent the locking of wheels during this period and apply a sufficient tire torque to the wheels after their coming down on the road.

What we claim is:

1. An anti-skid device for vehicles comprising a wheel speed voltage generator for generating a wheel speed voltage corresponding to the wheel speed, a reference wheel speed voltage generator for generating a reference wheel speed voltage when said wheel speed voltage reaches a predetermined deceleration, said reference wheel speed voltage decreasing at a rate corresponding to said predetermined deceleration with its initial value being a preset voltage lower than the voltage valve reached when said wheel speed voltage reaches said predetermined deceleration, a releasing signal generator for generating a braking force releasing signal when said reference wheel speed voltage is higher than said wheel speed voltage, a wheel speed detector for generating a signal upon detecting that the wheel speed is lower than a predetermined value, an AND circuit for generating a signal when both of said wheel speed detector and said releasing signal generator generate respective signals, means for changing the rate of decrease of said reference wheel speed voltage to a smaller value for a predetermined time after a signal is generated by said AND circuit, and means for reducing the braking force by the output signal from said releasing signal generator.

2. An anti-skid device for vehicles comprising a locking detector for detecting the performance of excessive braking on the wheels to produce a first releasing signal, a memory circuit for storing said first releasing signal for a predetermined time to produce an output signal during said predetermined time, a wheel speed detector for producing an output signal upon detecting that the wheel speed is below a predetermined speed, an AND circuit for producing an output signal when both of said wheel speed detector and said memory circuit produce respective output signals, a timer circuit for limiting the output signal from said AND circuit within a predetermined time to produce a second releasing signal for reducing the braking force, a circuit for causing said memory circuit to store said second releasing signal, and braking force modulator means for receiving said first and second releasing signals to reduce the braking force.

3. An anti-skid device for vehicles comprising a first braking force control unit provided for non-driven wheels, said first braking force control unit comprising a first locking detector for detecting the performance of excessive braking on said non-driven wheels to produce a first releasing signal for reducing the braking force, and first braking force modulator means for receiving said first releasing signal to reduce the braking force, and a second braking force control unit provided for driven wheels, said second braking force control unit comprising a second locking detector for detecting the performance of excessive braking on said driven wheels to produce a second releasing signal, a memory circuit for storing said second releasing signal for a predetermined time to produce an output signal during said predetermined time, a wheel speed detector for producing an output signal upon detecting that the wheel speed is below a predetermined speed, an AND circuit for producing an output signal when both of said wheel speed detector and said memory circuit produce respective output signals, a timer circuit for limiting the output signal from said AND circuit within a predetermined time to produce a third releasing signal for reducing the braking force, a circuit for causing said memory circuit to store said third releasing signal therein, and second braking force modulator means for receiving said second releasing signal and said third releasing signal to reduce the braking force.

4. An anti-skid device for vehicles according to Claim 3, wherein each of said first locking detector and said second locking detector comprises a wheel speed voltage generator, a reference wheel speed voltage generator for generating a reference wheel speed voltage when the rate of decrease of said wheel speed voltage reaches a predetermined deceleration, said reference wheel speed voltage decreasing as a function of said predetermined deceleration with its initial value being a preset voltage lower than the voltage valve reached when said wheel speed voltage reaches said predetermined deceleration, and a signal generator for generating a first or a second releasing signal when said reference wheel speed voltage is higher than said wheel speed voltage.

5. An anti-skid device for vehicles comprising a first braking force control unit provided for non-driven wheels, said first braking force control unit comprising a first locking detector for detecting the performance of excessive braking on said non-driven wheels to produce a first releasing signal for reducing the braking force and first braking force modulator means for receiving said first releasing signal to reduce the braking force, and a second braking force control unit provided for driven wheels, said second braking force control unit comprising a second locking detector for detecting the performance of excessive braking on said driven wheels to produce a second releasing signal and second braking force modulator means for receiving said second releasing signal to reduce the braking force, each of said first and second locking detectors are composed of a wheel speed voltage generator for generating a wheel speed voltage corresponding to the wheel speed of a vehicles wheel, a reference wheel speed voltage generator for generating a reference wheel speed voltage when the rate of decrease of said wheel speed voltage reaches a predetermined deceleration, said reference wheel speed voltage decreasing as a function of said predetermined deceleration with its initial value being a preset voltage lower than the voltage value reached when said wheel speed voltage reaches said predetermined deceleration, and a signal generator for generating a first or a second releasing signal when said reference wheel speed voltage becomes higher than said wheel speed voltage, said second braking force control unit further comprising a wheel speed detector for producing a signal upon detecting that the wheel speed of a vehicle wheel is below a predetermined value, an AND circuit for producing a signal when both the signal from said wheel speed detector and said second release signal are produced, means for changing the rate of decrease of said reference wheel speed voltage in said second locking detector to a smaller value only for a predetermined time after the generation of the signal from said AND circuit and means for releasing the braking force via the output from said releasing signal generator.

* * * * *

UNITED STATES PATENT OFFICE
CERTIFICATE OF CORRECTION

Patent No. 3,690,735　　　　　　　　　　Dated　September 12, 1972

Inventor(s) Hiroshi Arai, et al

It is certified that error appears in the above-identified patent and that said Letters Patent are hereby corrected as shown below:

In the heading add:

[30]　　　　Foreign Application Priority Data

December 6, 1969　　　Japan..............98008/69
　　January 8, 1970　　　　Japan...............2643/70

Signed and sealed this 13th day of March 1973.

(SEAL)
Attest:

EDWARD M. FLETCHER, JR.　　　　　　ROBERT GOTTSCHALK
Attesting Officer　　　　　　　　　　Commissioner of Patents